US011765301B2

(12) United States Patent
Nakano

(10) Patent No.: US 11,765,301 B2
(45) Date of Patent: Sep. 19, 2023

(54) IMAGE PROCESSING APPARATUS GENERATING IMAGE OF REVIEW QUESTION, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Kyosuke Nakano, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/943,504

(22) Filed: Sep. 13, 2022

(65) Prior Publication Data
US 2023/0105904 A1  Apr. 6, 2023

(30) Foreign Application Priority Data
Oct. 4, 2021  (JP) .................................. 2021-163538

(51) Int. Cl.
*H04N 1/00* (2006.01)
*H04N 1/32* (2006.01)

(52) U.S. Cl.
CPC ..... *H04N 1/32464* (2013.01); *H04N 1/00968* (2013.01)

(58) Field of Classification Search
None
See application file for complete search history.

(56) References Cited

U.S. PATENT DOCUMENTS

| 2006/0194189 A1* | 8/2006 | Koyama | G09B 7/00 434/362 |
| 2007/0031802 A1* | 2/2007 | Koyama | G09B 7/06 434/323 |
| 2015/0064683 A1* | 3/2015 | Rajagopalan | G09B 7/02 434/359 |
| 2017/0061809 A1* | 3/2017 | St. Jacques, Jr. | G09B 7/06 |
| 2018/0061263 A1* | 3/2018 | Nishihara | G09B 5/02 |
| 2018/0097964 A1* | 4/2018 | Yamada | H04N 1/00331 |
| 2021/0250456 A1* | 8/2021 | Asumi | H04N 1/00631 |
| 2021/0281697 A1* | 9/2021 | Suzuki | H04N 1/00816 |

FOREIGN PATENT DOCUMENTS

JP  2018106082 A  7/2018

* cited by examiner

*Primary Examiner* — Henok Shiferaw
(74) *Attorney, Agent, or Firm* — ROSSI, KIMMS & McDOWELL LLP

(57) ABSTRACT

An image processing apparatus capable of improving operability of a question preparer. The image processing apparatus including a memory device that stores instructions, and a processor that executes the instructions to: generate a question sheet image by controlling a reading unit to read a question sheet in which question sentences and question numbers are written, generate an answer sheet image by controlling the reading unit to read an answer sheet that includes answer fields, question numbers corresponding to the answer fields, and marks showing marking results, detect an answer field including a wrong answer mark from the answer sheet image, obtain a question number corresponding to the detected answer field from the answer sheet image, obtain a question sentence corresponding to the obtained question number from the question sheet image, and generate a review image including the obtained question sentence and a new answer field.

7 Claims, 15 Drawing Sheets

*FIG. 11*

| Question Number | Question Sentence |
|---|---|
| ② | Write "Mikan" in English. |
| ③ | Write "Yakyu" in English. |
| ⑤ | Write "Jitensha" in English. |

IMAGE PROCESSING APPARATUS GENERATING IMAGE OF REVIEW QUESTION, CONTROL METHOD THEREFOR, AND STORAGE MEDIUM STORING CONTROL PROGRAM THEREFOR

BACKGROUND OF THE INVENTION

Field of the Invention

The present invention relates to an image processing apparatus generating an image of a review question, a control method therefor, and a storage medium storing a control program therefor.

Description of the Related Art

In recent years, a technique that uses an image processing apparatus, such as a copying machine or a multifunction apparatus, to mark answers of a learning test by using an image process and to generate a learning image that summarizes questions is developed. Moreover, since it is known that a learning effect of review that answers again a question that was answered wrongly in a learning test is high, it is preferable to collect questions that were answered wrongly in the learning test and to generate a review image.

As such a technique, Japanese Laid-Open Patent Publication (Kokai) No. 2018-106082 (JP 2018-106082A) discloses a technique that generates question sheet data. Specifically, a question database that includes questions to which difficulties are respectively settled is prepared first. And then, an answer sheet of a test and an answer sheet in which correct answers are written are prepared and these sheets are scanned to obtain images. Then, the answers of the test are marked by comparing the images, and question sheet data is generated by selecting questions so that difficulties will depend on the score.

However, since the technique of the above-mentioned publication needs to prepare the question database and the answer sheet in which the correct answers are written, time and effort are required, which causes a problem in that operability of a question preparer is low.

SUMMARY OF THE INVENTION

The present invention provides an image processing apparatus, a control method therefor, and a storage medium storing a control program therefor, which are capable of improving operability of a question preparer.

Accordingly, an aspect of the present invention provides an image processing apparatus including a reading unit configured to read a sheet, a memory device that stores a set of instructions, and at least one processor that executes the set of instructions to: generate a question sheet image by controlling the reading unit to read a question sheet in which question sentences and question numbers of the question sentences are written, generate an answer sheet image by controlling the reading unit to read an answer sheet that includes answer fields in which answers to the questions are written, question numbers corresponding to the answer fields, and marks that are written to show marking results, detect an answer field including a wrong answer mark that shows a wrong answer from the answer sheet image, obtain a question number corresponding to the detected answer field from the answer sheet image, obtain a question sentence corresponding to the obtained question number from the question sheet image, and generate a review image including the obtained question sentence and a new answer field.

According to the present invention, the operability of a question preparer is improved.

Further features of the present invention will become apparent from the following description of exemplary embodiments with reference to the attached drawings.

BRIEF DESCRIPTION OF THE DRAWINGS

FIG. 11 is a view describing an example of a question number list that stores a detected question number.

DESCRIPTION OF THE EMBODIMENTS

Figure 1:
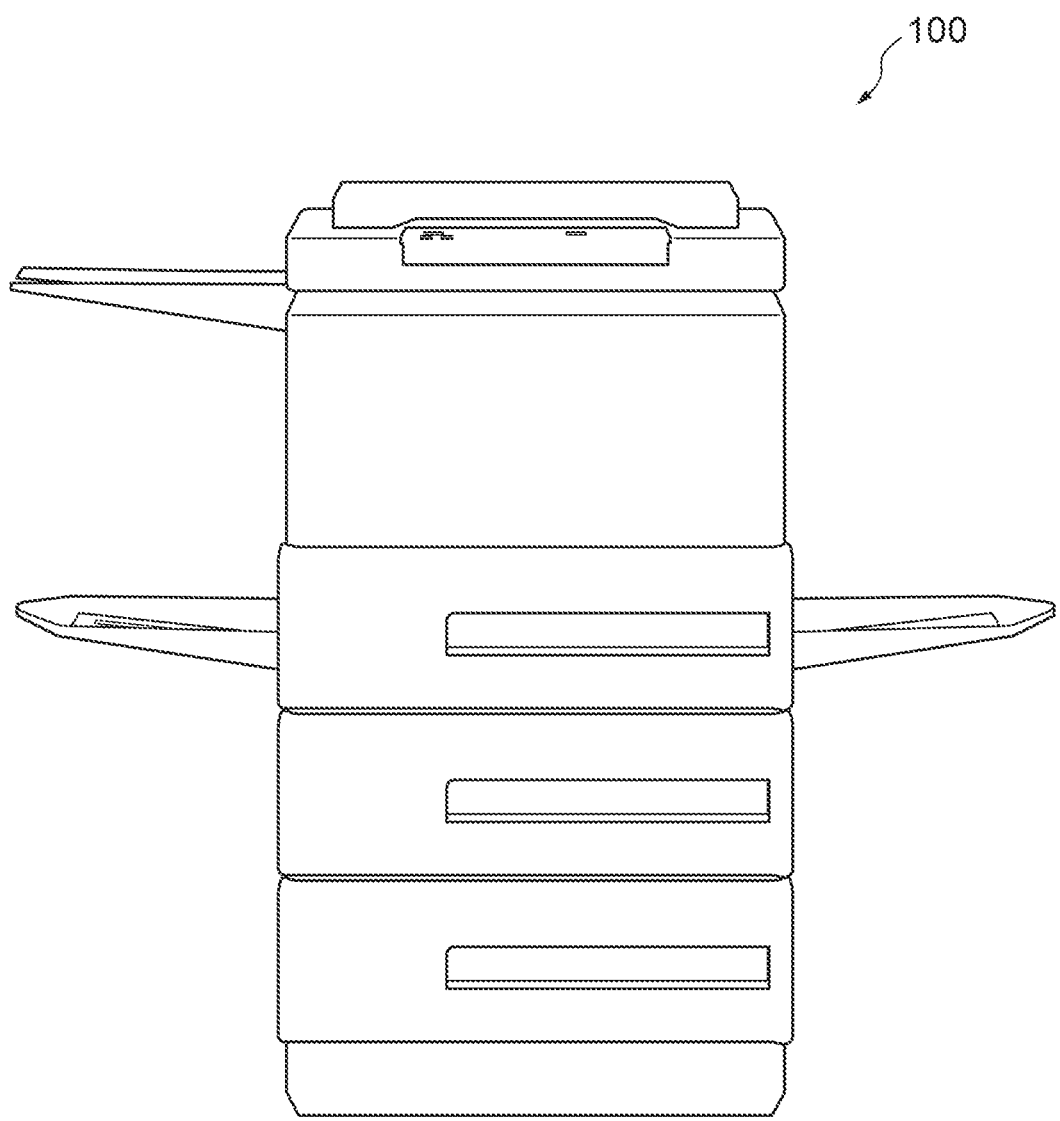
FIG. 1 is an external view showing an image forming apparatus as an image processing apparatus according to an embodiment of the present invention.

Hereafter, embodiments according to the present invention will be described in detail by referring to the drawings. FIG. 1 is an external view showing an image forming apparatus 100 as an image processing apparatus according to an embodiment of the present invention. The image forming apparatus 100 is what is called a multifunction printer, it reads a question sheet and a marked answer sheet, generates image data of the question sheet and image data of the answer sheet, and generates image data of a new question sheet on the basis of these image data of the sheets. In the embodiment, hereinafter, image data of a question sheet is called a "question sheet image", image data of an answer sheet is called an "answer sheet image", and image data of a new question sheet is called a "review image".

Figure 2:
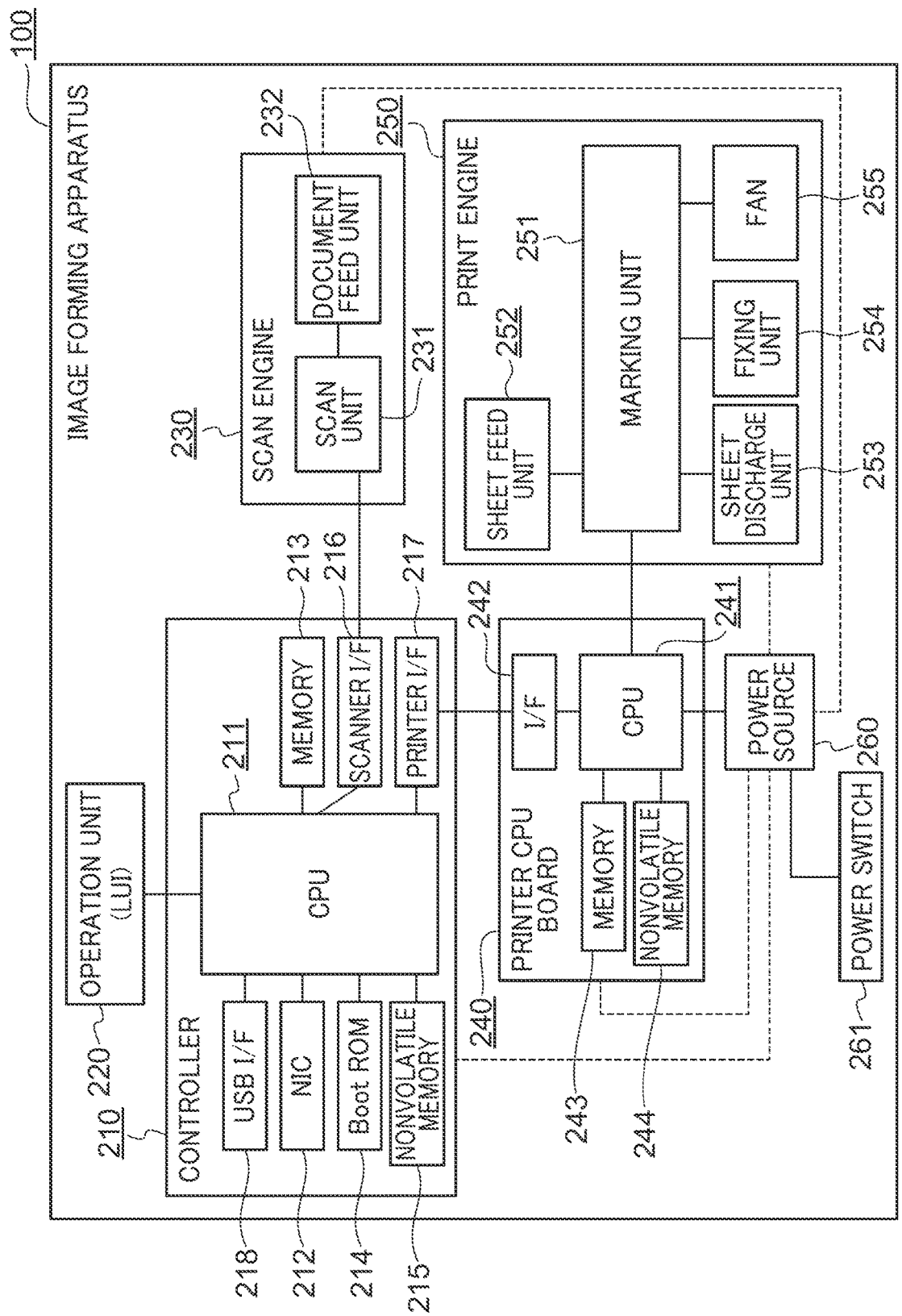
FIG. 2 is a block diagram schematically showing a hardware configuration of the image forming apparatus.

FIG. 2 is a block diagram schematically showing a hardware configuration of the image forming apparatus 100. As shown in FIG. 2, the image forming apparatus 100 is provided with a controller 210, an operation unit 220, a scan engine 230 (a reading unit), a print engine 250, a printer CPU board 240, a power source 260, and a power switch 261.

In the image forming apparatus 100, the scan engine 230 has a scan unit 231 and a document feed unit 232. The scan unit 231 optically scans a document placed on a platen etc. and converts an image of the document into digital image data. The document feed unit 232 automatically conveys a document one-by-one from a document bundle to the scan unit 231. Then, the scan engine 230 transmits the converted image data to the controller 210.

The print engine 250 has a marking unit 251 that charges, exposes, develops and transfers, a sheet feed unit 252, a sheet discharge unit 253, a fixing unit 254, and a fan 255 for cooling. The sheet feed unit 252 successively feeds a recording sheet one-by-one from a recording sheet bundle. The marking unit 251 forms an electrostatic latent image of the image data on the fed recording sheet. The fixing unit 254 fixes toner adsorbed to the electrostatic latent image of the recording sheet with heat and pressure, and prints the image data. The sheet feed unit 252 discharges a printed recording sheet.

The operation unit 220 is a local user interface (LUI) for operating the image forming apparatus 100, and consists of a touch panel for receiving a touch panel operation, an LCD for displaying a screen, and hard keys for receiving key input.

The controller 210 is connected with components of the image forming apparatus 100. A CPU 211 implemented in the controller 210 executes a job of the image forming apparatus 100. The controller 210 is a general-purpose CPU system and is provided with the CPU 211 that controls an entire CPU board, a memory 213 that is used as a work memory of the CPU 211, and a boot ROM 214 that includes a boot program. Furthermore, the controller 210 is provided with a NIC 212 for connecting with an external apparatus through a network, a USB I/F 218 that controls input and output with a USB memory, and a nonvolatile memory 215 including firmware.

The nonvolatile memory 215 may be mounted on the CPU board or may be connected to the CPU board. Moreover, the controller 210 is connected with the scan engine 230 through a scanner I/F 216 and is connected with the printer CPU board 240 through a printer I/F 217. It should be noted that the controller 210 corresponds to a detection unit, a question number obtaining unit, a question sentence obtaining unit, a generation unit, and a matching unit.

The printer CPU board 240 is provided with a CPU 241 that controls the entire board, a memory 243 that is used as a work memory of the CPU 241, a nonvolatile memory 244, and an I/F 242 that connects the CPU 241 to the controller 210.

Moreover, dotted lines in FIG. 2 indicate power source lines. The power source 260 supplies electric power to the controller 210, scan engine 230, printer CPU board 240, and print engine 250. The power switch 261 is a hardware switch for controlling ON/OFF of power supply. When the power switch 261 is turned ON, the boot program in the boot ROM 214 is read onto the memory 213 and is sequentially executed by the CPU 211. As a result, settings of various hardware components are executed and an OS is started. When the process of the boot program is completed, the CPU 211 operates according to a program (firmware) of the controller stored in the nonvolatile memory 215, which enables reception and execution of a job.

Incidentally, the embodiment premises that texts in a question sheet image, an answer sheet image, and a review image are written in horizontal writing. In the meantime, when texts in a question sheet image, an answer sheet image, and a review image are written in vertical writing, the present invention is applicable by exchanging an X-axis direction (a horizontal direction) and a Y-axis direction (a vertical direction).

The horizontal writing means that, when an upper left corner of image data is likened with an origin, a text is written in a positive direction (rightward) in the X-axis direction (horizontal direction) and a line is broken in a negative direction (downward) in the Y-axis direction (vertical direction). Moreover, the vertical writing means that, when an upper right corner of image data is likened with an origin, a text is written in the negative direction (downward) in the Y-axis direction (vertical direction) and a line is broken in a negative direction (leftward) in the X-axis direction (horizontal direction).

Figure 3:
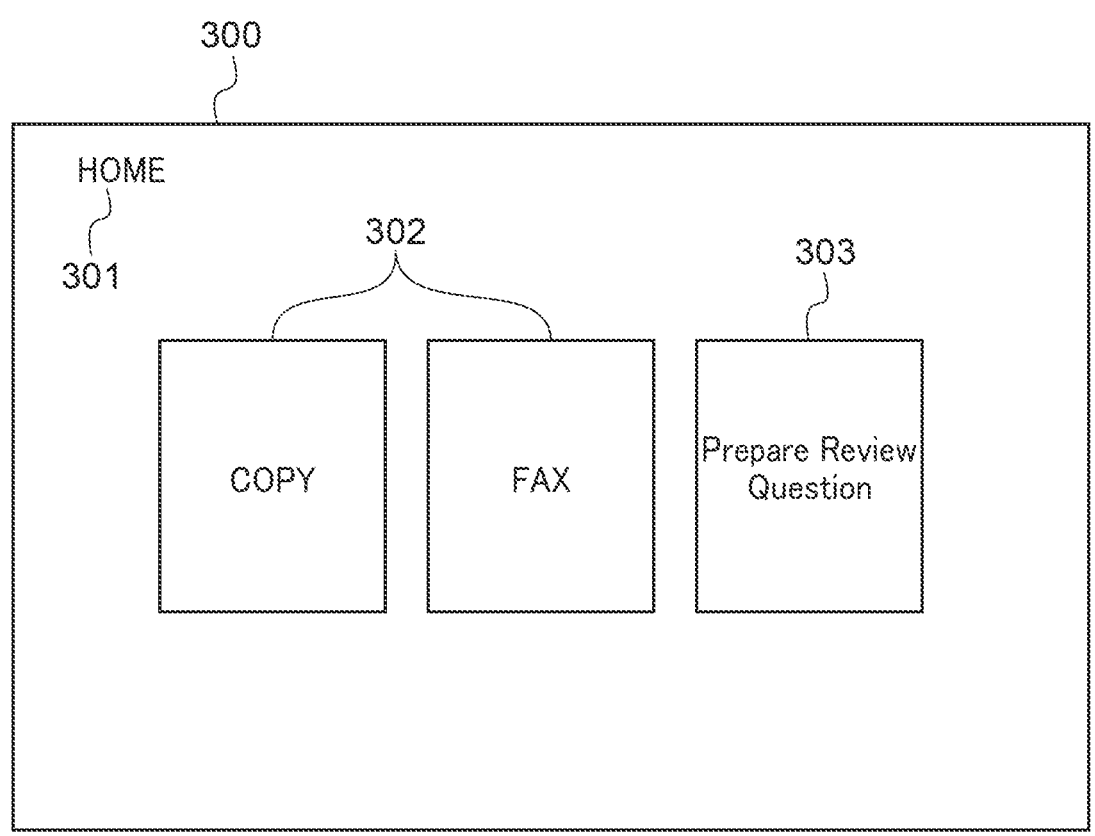
FIG. 3 is a view describing an example of a home screen displayed on an LCD of an operation unit of the image forming apparatus.

FIG. 3 is a view describing an example of a home screen displayed on the LCD of the operation unit 220 of the image forming apparatus 100. As shown in FIG. 3, the home screen 300 includes a notation 301 showing that the screen concerned is the home screen, icons 302 of jobs that are executable in the image forming apparatus 100, and an icon 303 of a review question preparation job. When a user selects one of the icons 302, a corresponding job, for example, a copy job or a facsimile job will be executed. When the user selects the icon 303, a scan start screen 400, which prompts the user to scan a question sheet and a marked answer sheet as preparation for executing the review question preparation job, will be displayed.

Figure 4:
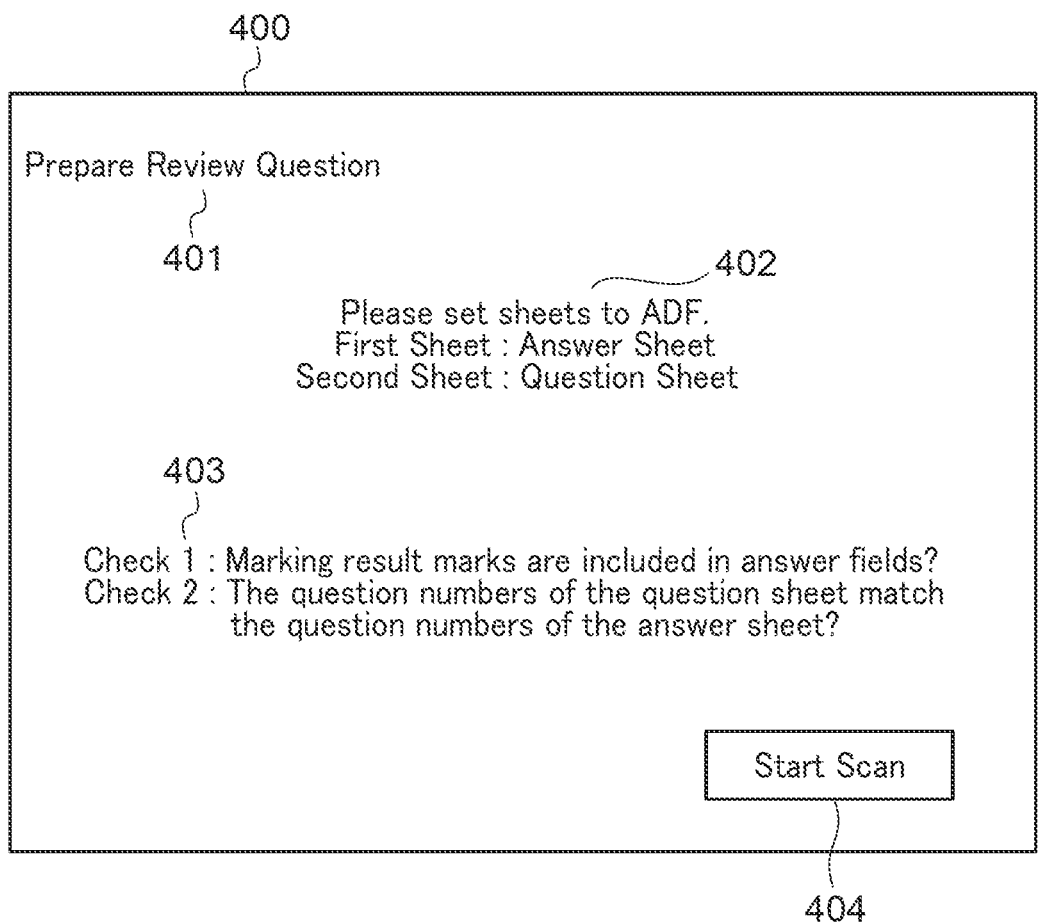
FIG. 4 is a view describing an example of a scan start screen.

FIG. 4 is a view describing an example of the scan start screen 400. The scan start screen 400 is also displayed on the LCD of the operation unit 220. The scan start screen 400 includes a notation 401 showing that the screen concerned is displayed for starting to scan review question preparation and a message 402 that prompts the user to set a question sheet and a marked answer sheet to the image forming apparatus 100. Moreover, the scan start screen 400 includes check points 403 for review question preparation and a scan start button 404 for designating start of the scan.

In the description, the message 402 prompts the user to set an answer sheet as a first sheet and a question sheet as a second sheet. In the meantime, when there are a plurality of answer sheets and question sheets or when a question sheet is scanned before scanning an answer sheet, the contents of the message 402 will be changed suitably.

Moreover, the check points 403 show points that should be checked about an answer sheet and a question sheet to the user. Specifically, the check points 403 prompt the user to check (check 1) whether a mark of the marking result is included in the answer field of the answer sheet and to check (check 2) whether question numbers of the question sheet match question numbers of the answer sheet. In the embodiment, since question sentences of the question sheet are associated with marking results in the answer fields of the answer sheet on the basis of the question numbers in generating a review image, the check 2 is particularly important. It should be noted that the check points 403 are not limited to the above-mentioned check 1 and check 2.

When the user touches the scan start button 404 in the scan start screen 400 after setting the question sheet and marked answer sheet to the image forming apparatus 100, a review question preparation process (FIG. 5) as a control method of the image processing apparatus according to the embodiment will be started. At this time, the review question preparation job is executed. When the review question preparation process is started, a review question under-preparation screen 600 shown in FIG. 6 is displayed on the LCD of the operation unit 220.

Figure 9:
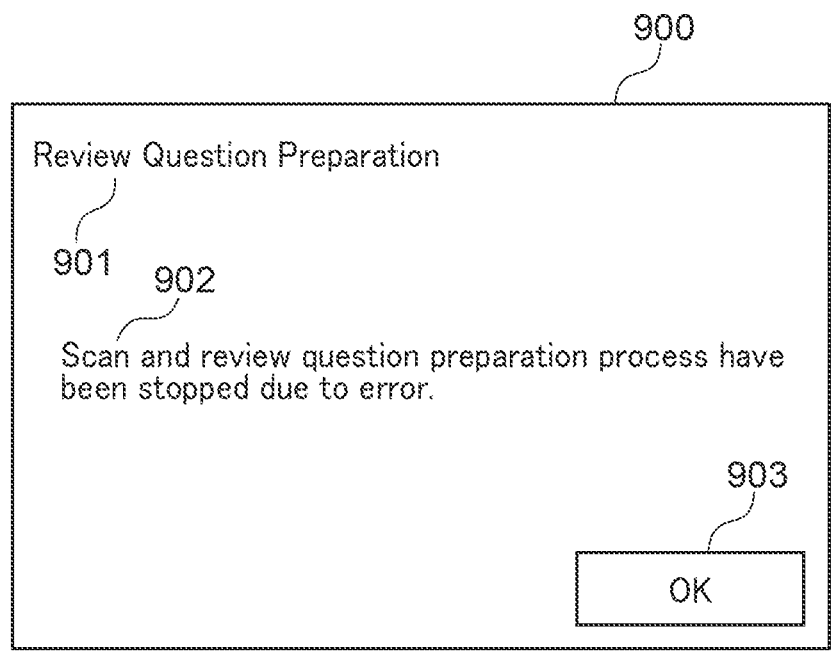
FIG. 9 is a view describing an example of an error screen.

The review question under-preparation screen 600 includes a notation 601 showing that the screen concerned is a screen relevant to the review question preparation process and a message 602 showing that the image forming apparatus 100 is executing the review question preparation process (review question preparation job). In principle, the review question under-preparation screen 600 is displayed until the review question preparation process is completed. However, if a certain error occurs in the course of the process concerned, an error screen 900 as shown in FIG. 9 is displayed, for example. It should be noted that the review question preparation process in FIG. 5 is executed because the CPU 211 operates according to the program of the review question preparation process stored in the nonvolatile memory 215 of the controller 210.

Figure 5:
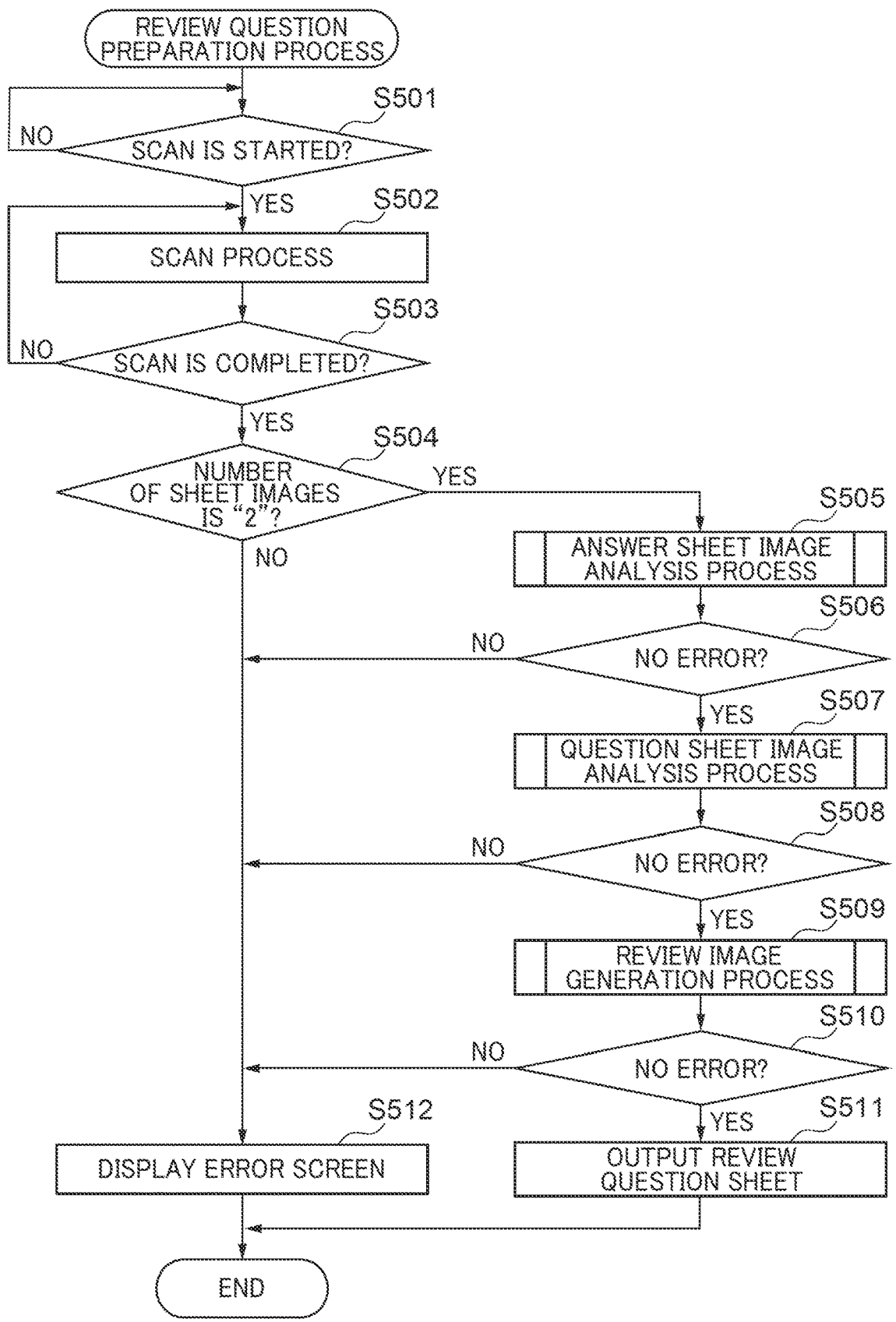
FIG. 5 is a flowchart showing a review question preparation process as a control method for the image processing apparatus according to the embodiment of the present invention.
Figure 6:
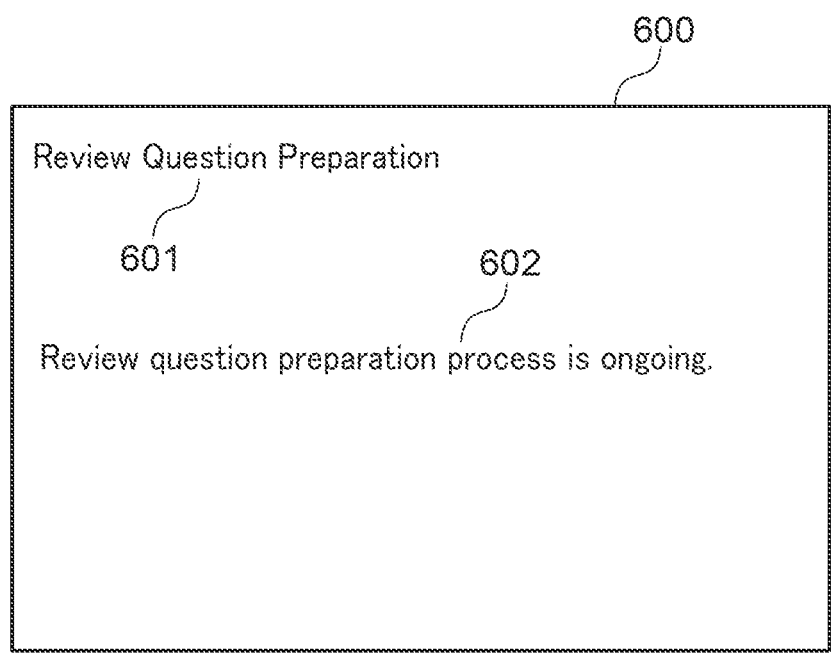
FIG. 6 is a view describing an example of a review question under-preparation screen.
Figure 7:
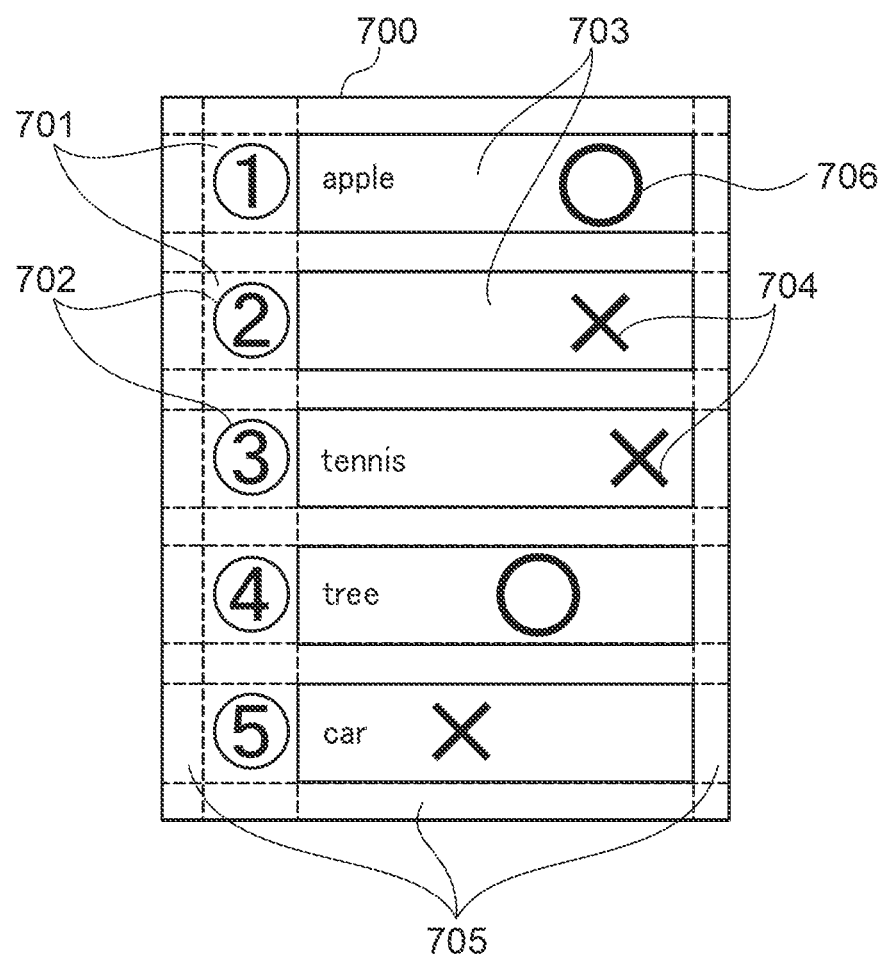
FIG. 7 is a view describing an example of an answer sheet image obtained in a step S502 in FIG. 5.
Figure 8:
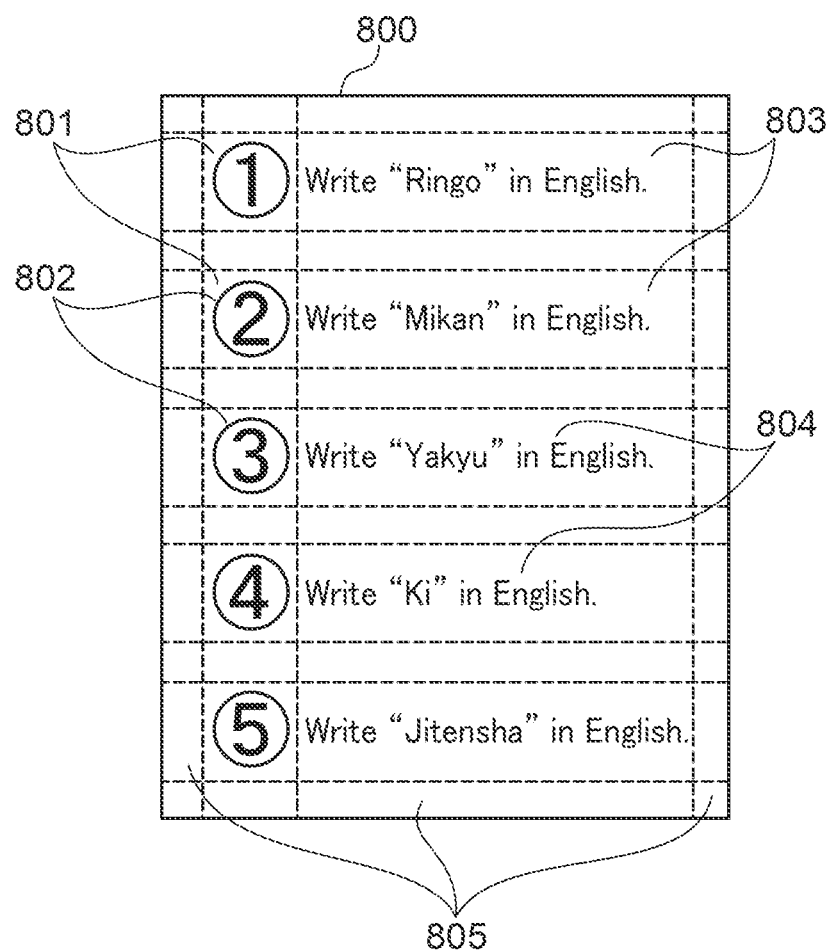
FIG. 8 is a view describing an example of a question sheet image obtained in the step S502.

In the review question preparation process in FIG. 5, it is first determined whether the user touches the scan start button 404 in a step S501. When the user does not touch the scan start button 404, the determination in the step S501 is repeated and the touch of the scan start button 404 is waited. Moreover, when the user touches the scan start button 404, the question sheet and marked answer sheet set in the image forming apparatus 100 are scanned and the question sheet image and answer sheet image are obtained (a step S502). FIG. 7 is a view describing an example of the answer sheet image 700 obtained in the step S502. FIG. 8 is a view describing an example of the question sheet image 800 obtained in the step S502.

As shown in FIG. 7, the answer sheet image 700 includes question number areas 701, the question numbers 702 written in the question number areas 701, answer fields 703 as rectangular areas in which answers are written, wrong answer marks 704 and correct answer marks 706 included in the answer fields 703, and margin areas 705.

In the answer sheet image 700, although a question number 702 is indicated by a symbol that encircles a numerical character with a circle, the format of the question number 702 is not limited to the example in FIG. 7 as long as a distinguishable numerical character is included. The question number areas 701 are respectively adjacent to the answer fields 703. And a question number 702 written in a question number area 701 adjacent to an answer field 703 corresponds to a question number 802 of a question sentence corresponding to the answer written in the answer field 703.

A tested person writes answers into the answer fields 703. Then, a marker writes the correct answer marks 706 and wrong answer mark 704 that respectively indicate the correct answers and wrong answers. Accordingly, in the embodiment, the answer field 703 including the wrong answer mark 704 is the answer field in which the wrong answer is written by the tested person, and the question sentence corresponding to the answer field 703 including the wrong answer mark 704 is a target of review. Although the wrong answer mark 704 is shown by a "X" mark in the answer sheet image 700, another mark may be used as the wrong answer mark 704 as long as it is understandable that the answer is wrong. It should be noted that the margin areas 705 are not subjected to an answer-sheet-image analysis process mentioned later in FIG. 10.

As shown in FIG. 8, the question sheet image 800 includes question number areas 801, the question numbers 802 written in the question number areas 801, question sentence areas 803 as rectangular areas in which question sentences are written, and margin areas 805. Moreover, the question sentences 804 are respectively included in the question sentence areas 803. The question number areas 801 are respectively adjacent to the question sentence areas 803. And a question number 802 written in a question number area 801 corresponds to a question sentence 804 written in a question sentence area 803 adjacent to the question number area 801 concerned.

Accordingly, a question sentence 804 that is a target of review is selected by reading a question sentence 804 corresponding to a question number 802 that matches a question number 702 corresponding to an answer field 703 including a wrong answer mark 704 in the answer sheet image 700. It should be noted that the margin areas 805 are not subjected to a question-sheet-image analysis process mentioned later in FIG. 12.

Although the embodiment premises that a marked answer sheet and a question sheet are scanned, two or more question sheets and/or marked answer sheets may be scanned. In this case, a plurality of answer sheet images 700 and/or question sheet images are analyzed in the answer-sheet-image analysis process in FIG. 10 and the question sheet image analysis process in FIG. 12, and a review image is generated on the basis of analysis results of the images.

Moreover, the embodiment premises that the marked answer sheet and the question sheet are scanned in this order, and it is determined whether the obtained image by scan corresponds to the answer sheet image 700 or the question sheet image 800 on the basis of the reading order of the image concerned.

Returning back to FIG. 5, it is determined in a step S503 whether the scan of the question sheet and the marked answer sheet was completed. When the scan is not completed, the process returns to the step S502 and the scan is continued. When the scan is completed, it is determined whether the number of sheet images obtained by the scan is "2" (a step S504).

When the number of sheet images obtained by the scan is "2", the process proceeds to a step S505. When the number of sheet images obtained by the scan is not "2", for example, when the number of sheet images obtained by the scan is "1", the process proceeds to a step S512. In the step S512, the error screen 900 shown in FIG. 9 is displayed on the LCD of the operation unit 220.

FIG. 9 is a view describing an example of the error screen 900. The error screen 900 shows that an error occurs during the review question preparation process and the review question preparation job was suspended. The error screen 900 includes a notation 901 showing that the screen concerned is relevant to the review question preparation process, a message 902 showing that the error occurred and the review question preparation process was suspended, and an OK button 903 for finishing the display of the error screen 900.

When the user touches the OK button 903, the review question preparation process is finished compulsorily and the home screen 300 is displayed on the LCD of the operation unit 220. When the review question preparation process is completed without causing an error and when a review image is output in a step S511 as mentioned later, the home screen 300 is displayed on the LCD of the operation unit 220.

In the next step S505, the answer-sheet-image analysis process is executed to detect the question number 702 corresponding to the answer field 703 including the wrong answer mark 704 by analyzing the answer sheet image.

Figure 10:
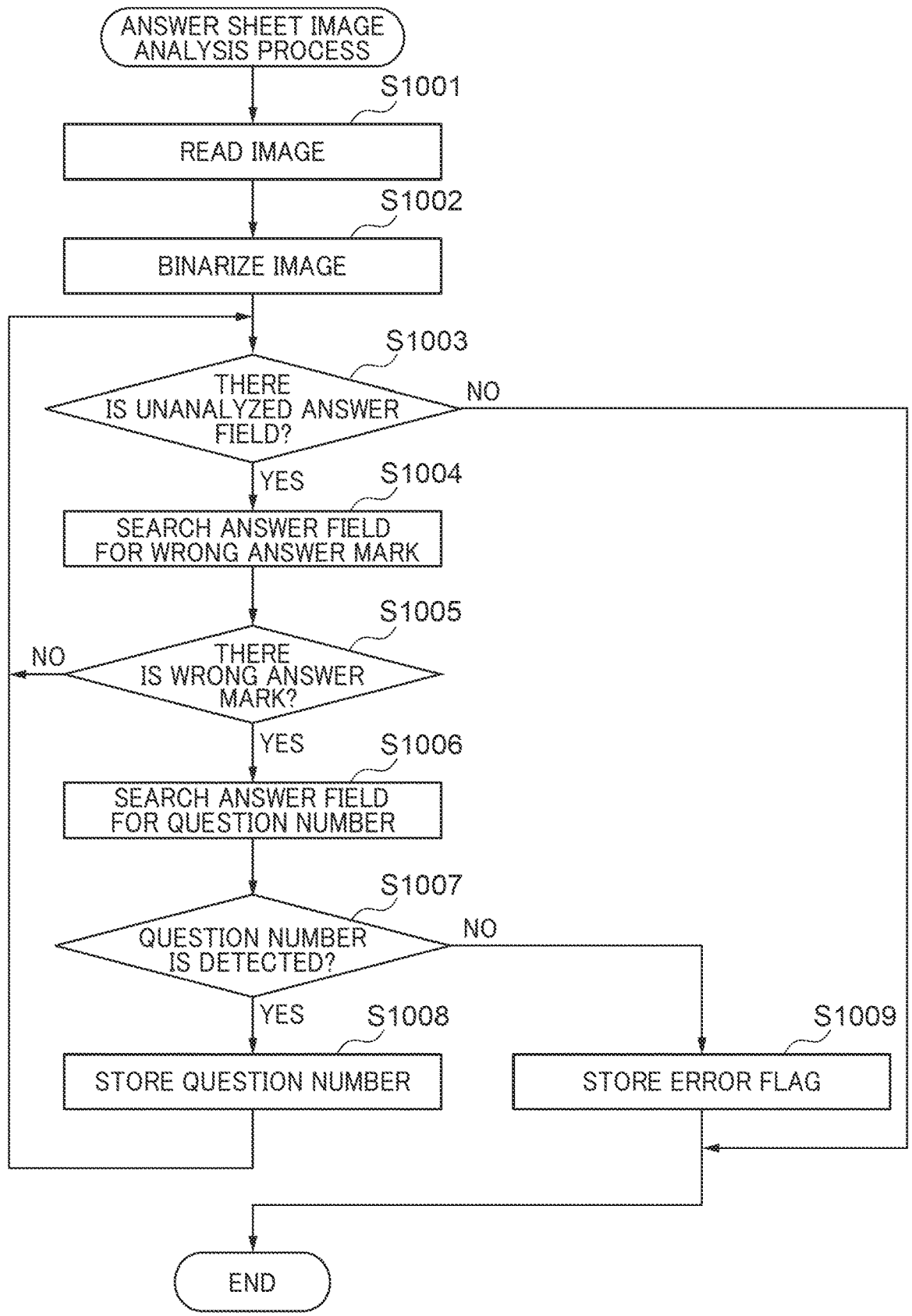
FIG. 10 is a flowchart showing an answer-sheet-image analysis process executed in a step S505 in FIG. 5.

FIG. 10 is a flowchart showing the answer-sheet-image analysis process executed in the step S505 in FIG. 5. As shown in FIG. 10, the answer sheet image 700 obtained in the step S502 is read first (a step S1001), and the answer sheet image 700 is binarized (a step S1002).

Next, in a step S1003, it is determined whether there is an answer field 703 that has not yet been subjected to search of the wrong answer mark 704 (hereinafter referred to as an "unanalyzed answer field") in the answer sheet image 700. When there is no unanalyzed answer field, the answer-sheet-image analysis process is finished. When there is an unanalyzed answer field, the unanalyzed answer field is searched for the wrong answer mark 704 (a step S1004), and then, it is determined whether the wrong answer mark 704 is included (a step S1005). A well-known determination method that stores a plurality of patterns of wrong answer marks beforehand and determines whether any wrong answer mark is found in the unanalyzed answer field may be used as the determination method of determining whether the wrong answer mark 704 is included.

When the unanalyzed answer field does not include the wrong answer mark 704, the process returns to the step S1003 after storing a fact that the unanalyzed answer field concerned has been searched for the wrong answer mark 704. When the unanalyzed answer field includes the wrong answer mark 704, the question number 702 written in the question number area 701 that is adjacent (corresponds) to the unanalyzed answer field concerned (a step S1006) is retrieved.

The question number 702 is retrieved using the method of applying a well-known character recognition process to the image of the question number area 701. Since the question number 702 is indicated by the symbol that encircles a numerical character with a circle in the embodiment, the retrieval method for the question number 702 is performed by detecting the symbol that encircles a numerical character with a circle from the image of the question number area 701 and recognizing the question number from the numerical character of the detected symbol. If the question number 702 is a symbol that does not include a numerical character, the question number is recognized by detecting the symbol applicable from the image of the question number area 701.

Next, in a step S1007, it is determined whether the question number 702 was detected in the step S1006. When it is determined that the question number 702 was detected from the question number area 701 corresponding to the unanalyzed answer field, the detected question number 702 is stored in a question number list 1100 (a step S1008). After that, the process returns to the step S1003.

FIG. 11 is a view describing an example of the question number list that stores a detected question number 702. As shown in FIG. 11, the question number list 1100 includes list columns of a table format and has a question number column 1101 that stores question numbers and a question sentence column 1103 that stores question sentences. In the step S1008, the question number 702 recognized in the step S1007 is stored in the question number column 1101 as a candidate question number 1102. At this time, the candidate question numbers 1102 stored in the question number column 1101 are sorted by an ascending order or a descending order.

Moreover, the question number list 1100 stores candidate question sentences 1104 later mentioned in association with the respective candidate question numbers 1102. Furthermore, the size of the unanalyzed answer field including the wrong answer mark 704 may be detected and may be stored in the question number list 1100 in the answer-sheet-image analysis process in FIG. 10. At this time, the detected size of the unanalyzed answer field is associated with the candidate question number 1102 corresponding to the question number 702 written in to the question number area 701 adjacent to the unanalyzed answer field concerned.

In the step S1007, when it is determined that the question number 702 was not detected from the question number area 701 corresponding to the unanalyzed answer field, the process proceeds to a step S1009, an error flag is stored, and the answer-sheet-image analysis process is finished.

Returning back to FIG. 5, it is determined whether an error occurred during the answer-sheet-image analysis process in FIG. 10 in a step S506 following the step S505. Specifically, it is determined whether the error flag is stored. When the error flag is stored, the process proceeds to a step S512 and the error screen 900 is displayed on the LCD of the operation unit 220 in the step S512. When no error flag is stored, the process proceeds to a step S507 and the question sheet image analysis process that analyzes the question sheet image and extracts the question sentence 804 corresponding to the candidate question number 1102 is executed in the step S507.

Figure 12:
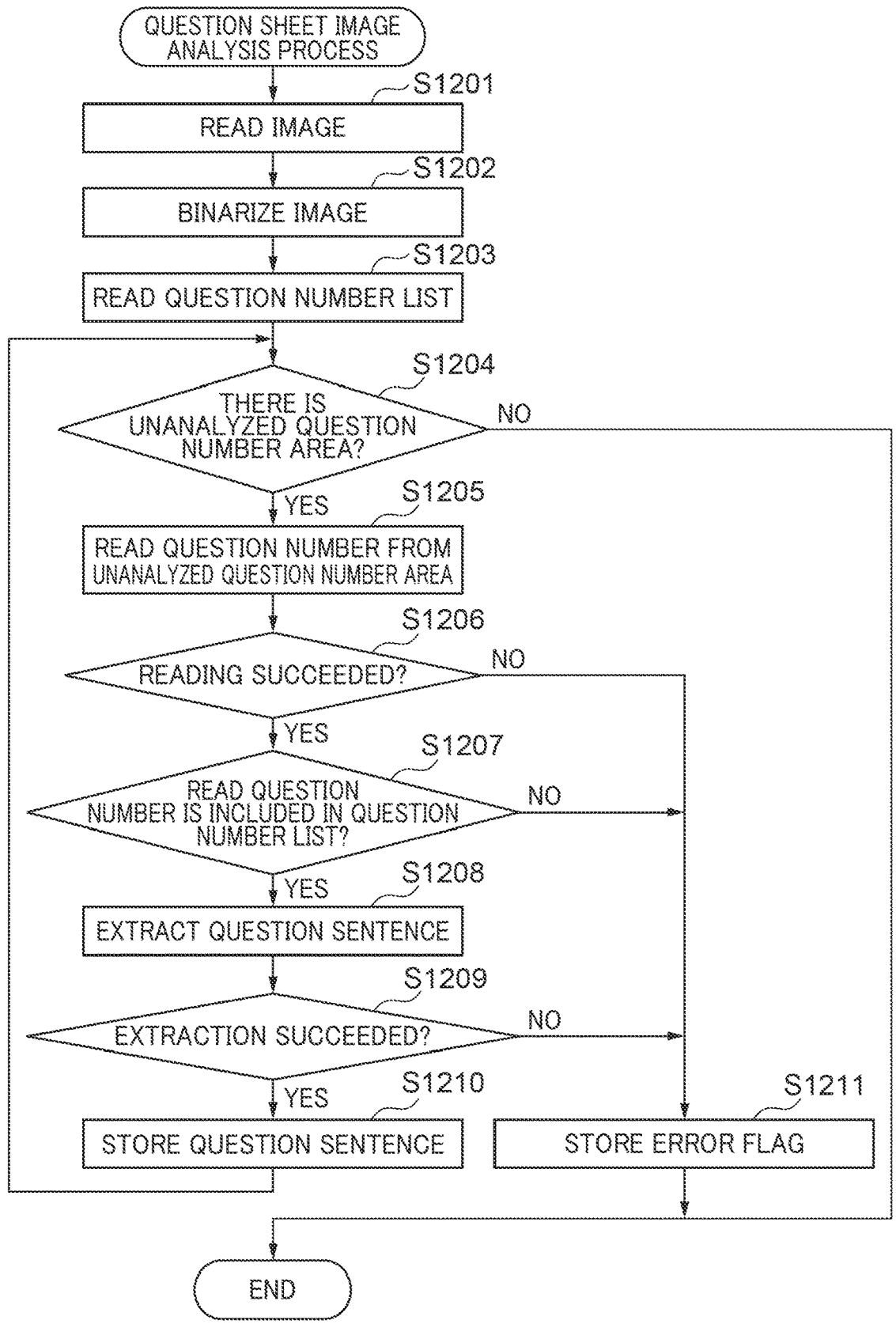
FIG. 12 is a flowchart showing a question sheet image analysis process executed in a step S507 in FIG. 5.

FIG. 12 is a flowchart showing the question-sheet-image analysis process executed in the step S507. As shown in FIG. 12, the question sheet image 800 obtained in the step S502 is read first (a step S1201), and the question sheet image 800 is binarized (a step S1202). After that, the question number list 1100 in which the candidate question number 1102 was stored in the step S1008 is read in a step S1203.

Next, it is determined whether there is a question number area 801 (hereinafter referred to as an "unanalyzed question number area") of which a question number 802 has not yet been read in the question sheet image 800 in a step S1204. When there is no unanalyzed question number area, the question-sheet-image analysis process is finished. When there is an unanalyzed question number area, the question number 802 is read from the unanalyzed question number area concerned (a step S1205).

Next, in a step S1206, it is determined whether the reading of the question number 802 succeeded in the step S1205. When it is determined that the reading of the question number 802 did not succeed, the process proceeds to a step S1211, the error flag is stored in the step S1211, and the question-sheet-image analysis process is finished. When it is determined that the reading of the question number 802 succeeded, the process proceeds to a step S1207.

Next, it is determined whether the candidate question number 1102 that is identical to the read question number 802 is stored in the question number column 1101 of the question number list 1100 in the step S1207. When it is determined that the candidate question number 1102 that is identical to the read question number 802 is not stored, the process proceeds to the step S1211, the error flag is stored in the step S1211, and the question-sheet-image analysis process is finished. When it is determined that the candidate question number 1102 that is identical to the read question number 802 is stored, the process proceeds to a step S1208.

When the candidate question number 1102 that is identical to the read question number 802 is stored, the question number 802 concerned corresponds to the question number 702 of the question number area 701 adjacent to the answer field 703 including the wrong answer mark 704 in the answer sheet image 700. Accordingly, the question sentence 804 included in the question sentence area 803 corresponding to the question number 802 concerned is a question sentence that was wrongly answered in the learning test.

In the step S1208, the question sentence 804 is extracted from the question sentence area 803 corresponding to the question number 802 read in the step S1205. As mentioned above, the extracted question sentence 804 was wrongly answered in the learning test. It should be noted that the question sentence 804 is extracted using a well-known method of character recognition from an image.

Next, in a step S1209, it is determined whether the extraction of the question sentence 804 succeeded in the step S1208. When it is determined that the extraction of the question sentence 804 did not succeed, the process proceeds to the step S1211, the error flag is stored in the step S1211, and the question-sheet-image analysis process is finished. When it is determined that the extraction of the question sentence 804 succeeded, the process proceeds to a step S1210.

In the following step S1210, the extracted question sentence 804 is stored in the question sentence column 1103 of the question number list 1100 as the candidate question sentence 1104 in association with the candidate question number 1102 that is identical to the question number 802 read in the step S1205. After that, the process returns to the step S1204.

Returning back to FIG. 5, it is determined whether an error occurred during the question-sheet-image analysis process in FIG. 12 in a step S508 following the step S507. Specifically, it is determined whether the error flag is stored. When the error flag is stored, the process proceeds to the step S512 and the error screen 900 is displayed on the LCD of the operation unit 220 in the step S512. When no error flag is stored, the process proceeds to the step S509, and a review image generation process that generates a review image 1400 using the question number list 1100 is executed in the step S509.

Figure 13:
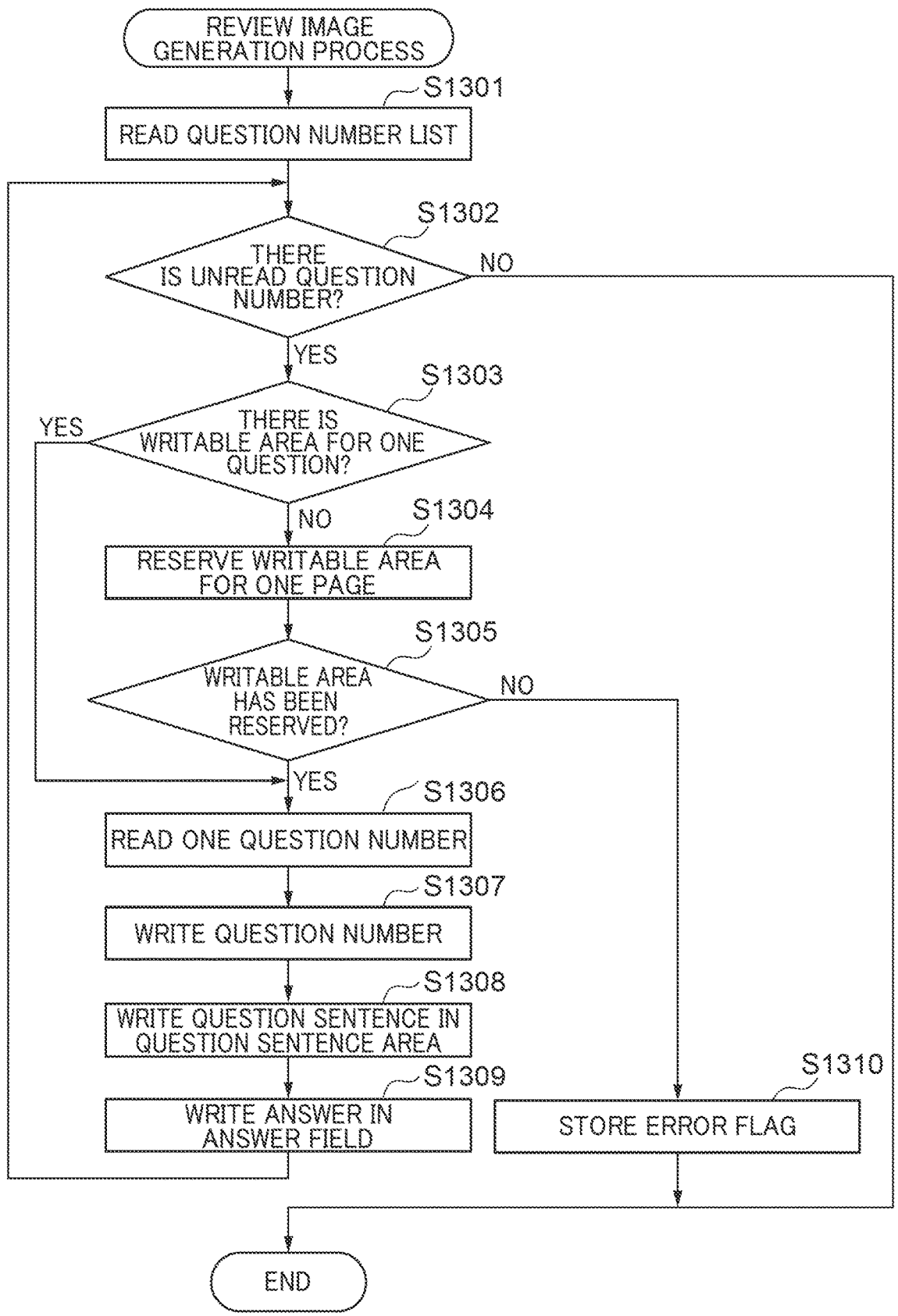
FIG. 13 is a flowchart showing a review image generation process executed in a step S509 in FIG. 5.
Figure 14:
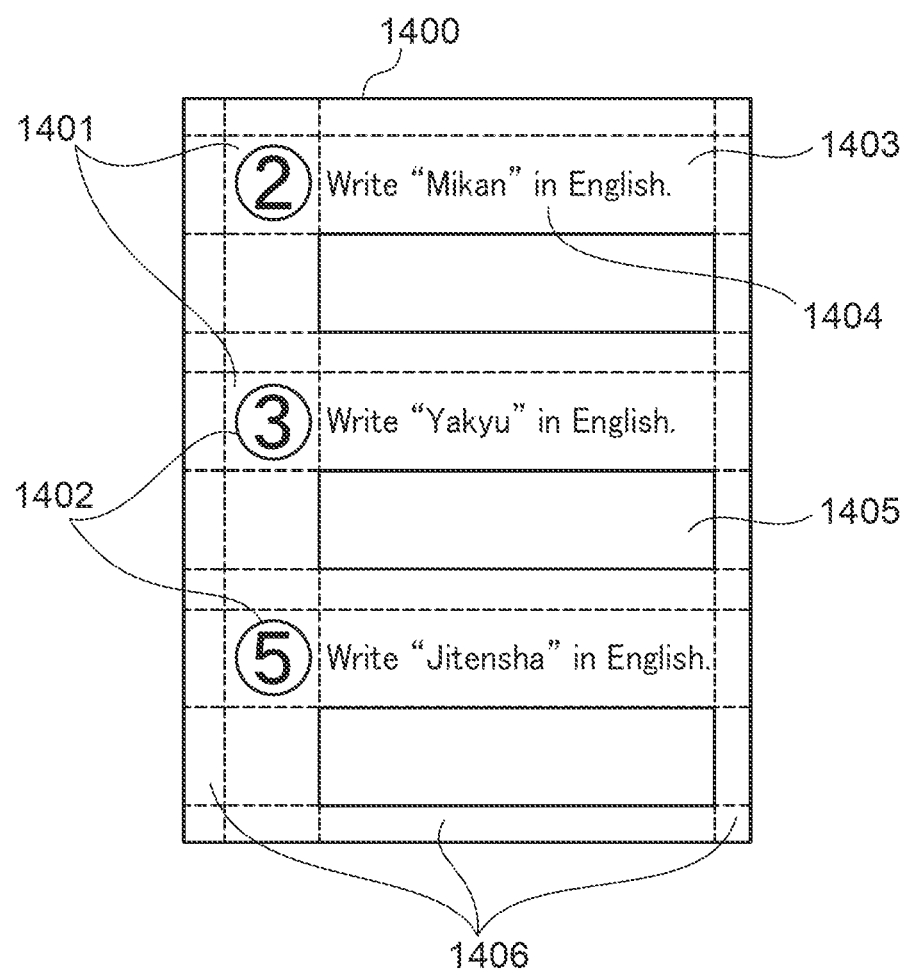
FIG. 14 is a view describing an example of a review image generated by the review image generation process shown in FIG. 13.

FIG. 13 is a flowchart showing the review image generation process executed in the step S509. Moreover, FIG. 14 is a view describing an example of the review image 1400 generated by the review image generation process shown in FIG. 13.

The review image 1400 includes question number areas 1401, question numbers 1402 written in the respective question number areas 1401, question sentence areas 1403, answer fields 1405, and margin areas 1406. The question sentence areas 1403 are rectangular areas in which review question sentences 1404 will be written. The answer fields 1405 are rectangular areas in which answers will be written.

The margin areas 1406 correspond to none of the question number areas 1401, the question sentence areas 1403, and the answer fields 1405. The margin areas 1406 are not subjected to the writing in the review image generation process in FIG. 13.

As shown in FIG. 13, the question number list 1100 is read first (a step S1301), and it is determined whether there is a candidate question number 1102 that has not been read (an unread question number) in the question number column 1101 in the question number list 1100 (a step S1302). When there is no candidate question number 1102 that has not been read, the review image generation process is finished. When there is a candidate question number 1102 that has not been read, it is determined whether a memory area in which the question information about one question is writable is remaining in the writable area corresponding to one page of the review image 1400 reserved in the memory 213 of the controller 210 (a step S1303).

In the description, "the question information about one question" is the information that combines the question sentence area 1403 for one question, the question number area 1401 corresponding to this, and the answer field 1405 for one question. Moreover, the writable area corresponding to one page of the review image 1400 is simply called a "writable area", hereinafter.

As a result of the determination in the step S1303, when the memory area in which the question information about one question is writable is remaining in the writable area, the process proceeds to a step S1306 mentioned later. In the meantime, when the memory area in which the question information about one question is writable is not remaining in the writable area in the memory 213, the process proceeds to a step S1304 and the writable area is reserved in the memory 213 (a step S1304).

It is determined that the memory area in which the question information about one question is writable is not remaining when the writable area that has been already reserved does not have sufficient capacity or when the process in the step S1303 is executed for the first time. When the process in the step S1303 is executed for the first time, the writable area is not reserved because the process in the step S1304 has not been executed, and there is naturally no memory area in which the question information is written.

Next, in a step S1305, it is determined whether the writable area has been reserved in the memory 213 in the step S1304. When it is determined that the writable area has not been reserved, the process proceeds to a step S1310, the error flag is stored in the step S1310, and the review image generation process is finished. When it is determined that the writable area has been reserved, the process proceeds to a step S1306.

In the step S1306, one candidate question number 1102 is read from the question number column 1101 of the question number list 1100. In a step S1307, the read candidate question number 1102 concerned is written in the question number area 1401 as the question number 1402. Furthermore, the candidate question sentence 1104 corresponding to the written-in candidate question number 1102 is read from the question sentence column 1103. And the read candidate question sentence 1104 concerned is written in the question sentence area 1403 as the review question sentence 1404 (a step S1308). At this time, the question number 1402 and the review question sentence 1404 are written in the review image 1400 so as to be adjacent to each other (see FIG. 14). Specifically, the question number 1402 and the review question sentence 1404 are arranged horizontally.

Next, in a step S1309, the answer field 1405 is written in the review image 1400 so as to be adjacent to the question sentence area 1403 in which the review question sentence 1404 was written in the step S1308. Specifically, the answer field 1405 and the question sentence area 1403 are written so as to be arranged vertically. At this time, it is preferable to determine the size of the answer field 1405 using the size of the unanalyzed answer field stored in the question number list 1100. After that, the process returns to the step S1302.

When the processes in the steps S1306 through S1309 are repeated, it is preferable that the question numbers 1402 be sorted by an ascending order or descending order and that the review question sentences 1404 and the answer fields 1405 corresponding to the respective question numbers 1402 be rearranged according to the sort.

Returning back to FIG. 5, it is determined whether an error occurred during the review image generation process in FIG. 13 in a step S510 following the step S509. Specifically, it is determined whether the error flag is stored. When the error flag is stored, the process proceeds to the step S512 and the error screen 900 is displayed on the LCD of the operation unit 220. When no error flag is stored, the review question under-preparation screen 600 is displayed on the LCD and the process proceeds to a step S511.

Figure 15:
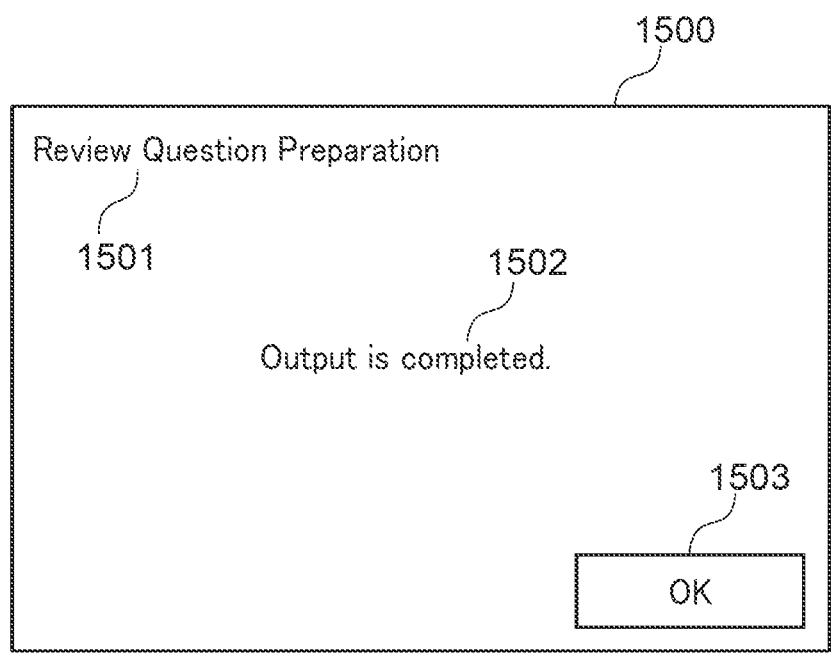
FIG. 15 is a view describing an example of a review-question-sheet generation completion screen.

In the next step S511, a review question sheet is output by printing the review image 1400 generated in the step S509 on a sheet. The output method of the review image 1400 is not limited to the print on a sheet. For example, a method of transmitting the review image 1400 to a server, a cloud, a USB memory, another image processing apparatus, etc. may be employed. After that, a review-question-sheet generation completion screen 1500 shown in FIG. 15 is displayed on the LCD of the operation unit 220, and this process is finished.

The review-question-sheet generation completion screen 1500 includes a notation 1501 showing that the screen concerned is relevant to the review question preparation process, a message 1502 showing that the output of the review question sheet is completed, and an OK button 1503 for finishing the display of the screen concerned. When the user touches the OK button 1503, the home screen 300 is displayed on the LCD of the operation unit 220 instead of the review-question-sheet generation completion screen 1500.

According to the embodiment, the question sheet and the marked answer sheet are scanned and the question sheet image 800 and the answer sheet image 700 are obtained. After that, the question number 702 corresponding to the answer field 703 including the wrong answer mark 704 is detected from the answer sheet image 700, and the detected question number 702 is stored in the question number list 1100 as the candidate question number 1102.

Moreover, the question sentence 804 of the question number 802 corresponding to the candidate question number 1102 is extracted from the question sheet image 800, and the extracted question sentence 804 is stored in the question number list 1100 as the candidate question sentence 1104 in association with the candidate question number 1102.

After that, the review image 1400 including the review question sentences 1404 is generated using the candidate question numbers 1102 and the candidate question sentences 1104 that are stored in the question number list 1100, and the review question sheet is output.

That is, the wrong answer mark 704 is detected from the answer sheet image 700 obtained by scanning the marked answer sheet in the embodiment. Furthermore, the question sentence 804 that was wrongly answered is extracted from the question sheet image 800 obtained by scanning the question sheet on the basis of the question number 702 corresponding to the detected wrong answer mark 704, and is used as the review question sentence 1404.

Accordingly, since a question preparer is not required to prepare a question database and a sheet on which correct answers are written in generating the review question sheet, the image forming apparatus 100 that has good operability for the question preparer is provided.

Although the preferable embodiment of the present invention has been described above, the present invention is not limited to the above-mentioned embodiment. Various modifications and changes are available within the scope of the gist.

The embodiment premises that the marked answer sheet and the question sheet are scanned in this order, and distinction of whether the obtained image by scan corresponds to the answer sheet image 700 or the question sheet image 800 is performed on the basis of the reading order of the images concerned. In the meantime, the distinction of whether the obtained image by scan corresponds to the answer sheet image 700 or the question sheet image 800 is performed on the basis of the presence of the mark showing the marking result. In this case, the image including the mark is determined as the answer sheet image 700.

Moreover, although the review image 1400 includes the question number 1402, the review image 1400 may include the review question sentence 1404 only and may exclude the question number 1402 in order to attain necessary minimum learning effect.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-163538, filed Oct. 4, 2021, which is hereby incorporated by reference herein in its entirety.

What is claimed is:

1. An image processing apparatus comprising:
a reading unit configured to read a sheet;
a memory device that stores a set of instructions; and
at least one processor that executes the set of instructions to:
  generate a question sheet image by controlling the reading unit to read a question sheet in which question sentences and question numbers of the question sentences are written;
  generate an answer sheet image by controlling the reading unit to read an answer sheet that includes answer fields in which answers to the questions are written, question numbers corresponding to the answer fields, and marks that are written to show marking results;
  detect an answer field including a wrong answer mark that shows a wrong answer from the answer sheet image;
  obtain a question number corresponding to the detected answer field from the answer sheet image;

obtain a question sentence corresponding to the obtained question number from the question sheet image; and generate a review image including the obtained question sentence and a new answer field.

2. The image processing apparatus according to claim 1, wherein the at least one processor executes the set of instructions to:

associate the obtained question number with the obtained question sentence; and add the question number associated with the obtained question sentence to the review image.

3. The image processing apparatus according to claim 1, wherein the at least one processor executes the set of instructions to arrange, in a case where a plurality of question sentences are obtained, the obtained question sentences according to an order of the question numbers in the review image.

4. The image processing apparatus according to claim 1, wherein the at least one processor executes the set of instructions to distinguish the question sheet image and the answer sheet image according to presence of the marks showing the marking results.

5. The image processing apparatus according to claim 1, wherein the at least one processor executes the set of instructions to:

detect a size of the answer field including the wrong answer mark; and generate the review image using the detected size of the answer field.

6. A control method for an image processing apparatus, the control method comprising:

generating a question sheet image by reading a question sheet in which question sentences and question numbers of the question sentences are written;

generating an answer sheet image by reading an answer sheet that includes answer fields in which answers to the questions are written, question numbers corresponding to the answer fields, and marks that are written to show marking results;

detecting an answer field including a wrong answer mark that shows a wrong answer from the answer sheet image;

obtaining a question number corresponding to the detected answer field from the answer sheet image;

obtaining a question sentence corresponding to the obtained question number from the question sheet image; and generating a review image including the obtained question sentence and a new answer field.

7. A non-transitory computer-readable storage medium storing a control program executable by a computer to execute a control method for an image processing apparatus, the control method comprising:

generating a question sheet image by reading a question sheet in which question sentences and question numbers of the question sentences are written;

generating an answer sheet image by reading an answer sheet that includes answer fields in which answers to the questions are written, question numbers corresponding to the answer fields, and marks that are written to show marking results;

detecting an answer field including a wrong answer mark that shows a wrong answer from the answer sheet image;

obtaining a question number corresponding to the detected answer field from the answer sheet image;

obtaining a question sentence corresponding to the obtained question number from the question sheet image; and generating a review image including the obtained question sentence and a new answer field.

\* \* \* \* \*